US012789361B2

(12) United States Patent
Rus et al.

(10) Patent No.: US 12,789,361 B2
(45) Date of Patent: Nov. 10, 2026

(54) ROBOT TRAINING SYSTEM

(71) Applicant: Massachusetts Institute of Technology, Cambridge, MA (US)

(72) Inventors: Daniela Rus, Weston, MA (US); Joseph Jeff Delpreto, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 770 days.

(21) Appl. No.: 18/087,615

(22) Filed: Dec. 22, 2022

(65) Prior Publication Data

US 2023/0202026 A1 Jun. 29, 2023

Related U.S. Application Data

(60) Provisional application No. 63/293,331, filed on Dec. 23, 2021.

(51) Int. Cl.

*B25J 9/00* (2006.01)
*B25J 9/16* (2006.01)
*G06F 3/01* (2006.01)

(52) U.S. Cl.

CPC ........... *B25J 9/0081* (2013.01); *B25J 9/1664* (2013.01); *G06F 3/015* (2013.01); *G06F 3/017* (2013.01)

(58) Field of Classification Search

CPC ........ B25J 9/0081; B25J 9/1664; B25J 9/163; G06F 3/015; G06F 3/017; G05B 2219/40116

See application file for complete search history.

(56) References Cited

U.S. PATENT DOCUMENTS

| | | | | |
|---|---|---|---|---|
| 8,958,912 B2 * | 2/2015 | Blumberg | B25J 9/1682 | 700/259 |
| RE46,310 E * | 2/2017 | Hoffberg | H04N 21/252 | |
| 2012/0197464 A1 * | 8/2012 | Wang | G05D 1/0038 | 701/28 |
| 2016/0059412 A1 * | 3/2016 | Oleynik | G05B 19/42 | 700/250 |
| 2019/0291277 A1 * | 9/2019 | Oleynik | B25J 9/1669 | |
| 2019/0314984 A1 * | 10/2019 | Gonzalez Aguirre | B25J 9/1664 | |
| 2022/0161427 A1 * | 5/2022 | Yerazunis | B25J 9/1674 | |

FOREIGN PATENT DOCUMENTS

CN 109590987 B 6/2021

OTHER PUBLICATIONS

Yang Chenguang et al: "A Learning Framework of Adaptive Manipulative Ski11s From Human to Robot", IEEE Transactions on Industrial Informatics, IEEE Service Center, New York, NY, US, vo1. 15, No. 2, Feb. 1, 2019 (Feb. 1, 2019), pp. 1153-1161, XP011708962.

* cited by examiner

*Primary Examiner* — Sihar A Karwan
(74) *Attorney, Agent, or Firm* — Zachary Rimkunas

(57) ABSTRACT

A method for configuring an electromechanical system to perform a first task includes accepting a specification of the first task, accepting first user input from an operator related to the first task, the first user input including a representation of user-referenced points, and forming control data for causing the system to perform the task based on the specification of the first task and the first user input.

19 Claims, 8 Drawing Sheets

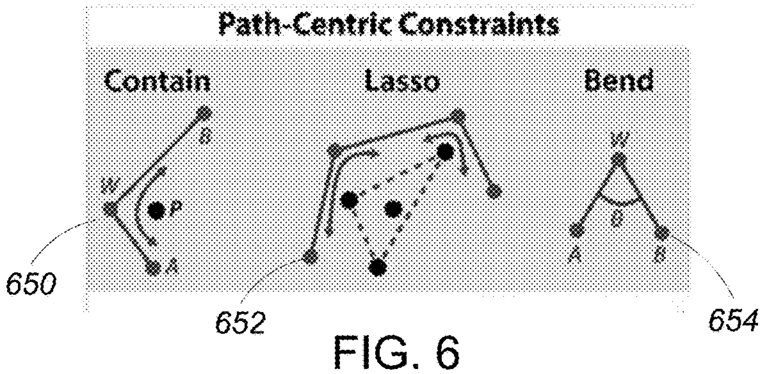

FIG. 6

750

| | |
|---|---|
| Formulation | $(\overline{WA} \times \overline{WP})(\overline{WA} \times \overline{WB}) \geq 0$<br>$(\overline{WB} \times \overline{WP})(\overline{WB} \times \overline{WA}) \geq 0$ |
| Scale factor | $\left[(scale)\left(\frac{scale}{5}\right)(0.6)\right]^2$ |
| Application criteria | • Formulation is satisfied<br>• $\lvert WP\rvert \leq 0.75 \times \min(\lvert WA\rvert, \lvert WB\rvert)$<br>• $\lvert WP\rvert < 2 \times \lvert WP_{all\ other\ POIs}\rvert$<br>• $\lvert WP\rvert > \frac{scale}{70}$ |
| Generalize to a specific waypoint-POI pair | • Add Buffer constraints such that $\frac{\lvert W_{new}P_{new}\rvert}{scale_{new}} \geq \frac{\min(d(P,\overline{WA}), d(P,\overline{WB}))}{2}$ |
| Generalize to waypoint independent of POIs | N/A |
| Relaxation | N/A |
| Warrants waypoint creation | Yes |

FIG. 7

852

| | |
|---|---|
| **Formulation** | Same formulation as for the Contain class, applied between every waypoint-POI pair |
| **Scale factor** | See above |
| **Application criteria** | Formulation is satisfied |
| **Generalize to a specific waypoint-POI pair** | N/A |
| **Generalize to waypoint independent of POIs** | Add a Contain constraint between every waypoint-POI pair |
| **Relaxation** | N/A |
| **Warrants waypoint creation** | Yes |

FIG. 8

954

| | |
|---|---|
| **Formulation** | $\cos(\theta_{min}) \geq \cos(\theta) \geq \cos(\theta_{max})$<br>where $\cos(\theta) = \frac{\overline{WA} \cdot \overline{WB}}{\lvert WA\rvert \lvert WB\rvert}$ |
| **Scale factor** | 1 |
| **Application criteria** | Always |
| **Generalize to a specific waypoint-POI pair** | N/A |
| **Generalize to waypoint independent of POIs** | Apply $\theta_{min} = 10°$, $\theta_{max} = 170°$ |
| **Relaxation** | Remove constraints |
| **Warrants waypoint creation** | No |

FIG. 9

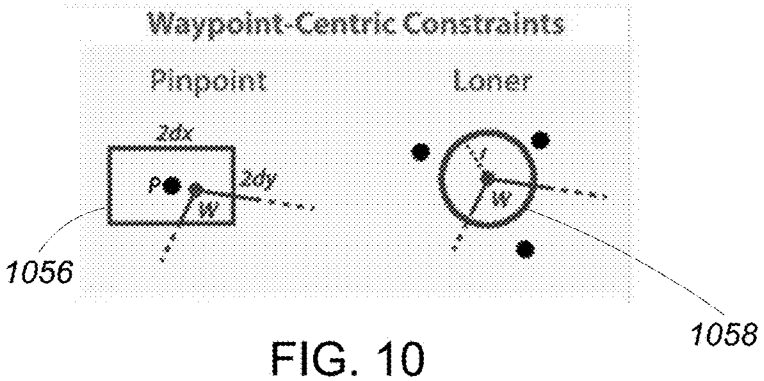

FIG. 10

1156

| | |
|---|---|
| **Formulation** | $P_x + d_x \geq W_x \geq P_x - d_x$<br>$P_y + d_y \geq W_y \geq P_y - d_y$ |
| **Scale factor** | N/A |
| **Application criteria** | $\frac{\|WP\|}{scale} \leq \frac{1}{3}$ |
| **Generalize to a specific waypoint-POI pair** | Enforce $\frac{\|W_{new}P_{new}\|}{scale} \leq \min\left(1.5 \times \frac{\|WP\|}{scale}, \frac{1}{3}\right)$ |
| **Generalize to waypoint independent of POIs** | N/A |
| **Relaxation** | $d_x' = \frac{5}{3} d_x \qquad d_y' = \frac{5}{3} d_y$ |
| **Warrants waypoint creation** | Yes |

FIG. 11

1258

| | |
|---|---|
| **Formulation** | $\|WP_i\| \geq r$ for all POI $P_i$ |
| **Scale factor** | $scale$ |
| **Application criteria** | $\min\left(\frac{\|WP_i\|}{scale} \text{ for all POI } P_i\right) \geq \frac{2}{3}$ |
| **Generalize to a specific waypoint-POI pair** | Enforce $\frac{\|WP_i\|}{scale_{new}} \geq \frac{1}{3}$ for all POI $P_i$ |
| **Generalize to waypoint independent of POIs** | N/A |
| **Relaxation** | $r' = \frac{r}{2}$ |
| **Warrants waypoint creation** | Yes |

Table 5: Constraint library - properties for the Loner class

FIG. 12

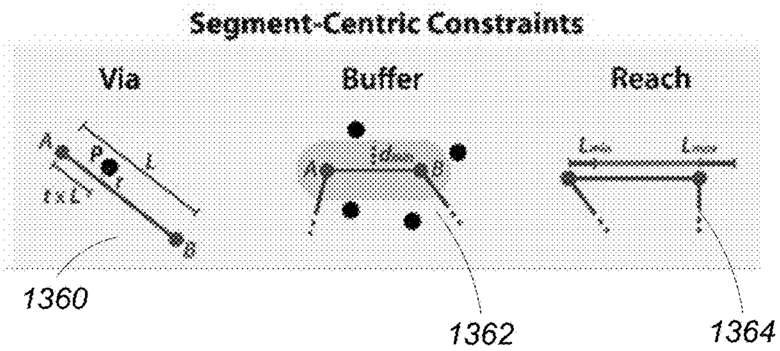

FIG. 13

1460

| | |
|---|---|
| Formulation | • $(t - t_{min})(t_{max} - t) \geq 0$<br>• $r \leq d_{max}$ |
| Scale factor | • 1 for bounds on $t$<br>• *scale* for bounds on $r$ |
| Application criteria | • $\frac{r}{scale} \leq \frac{1}{6}$<br>• $\frac{1}{3} \leq t \leq \frac{2}{3}$ |
| Generalize to a specific waypoint-POI pair | Enforce<br>• $\frac{r_{new}}{scale_{new}} = \min\left(1.5r, \frac{1}{3}\right)$<br>• $\frac{1}{3} \leq t_{new} \leq \frac{2}{3}$ |
| Generalize to waypoint independent of POIs | N/A |
| Relaxation | • $r' = \frac{3}{2} r$<br>• $t'_{min} = \frac{2}{3} t_{min}$<br>• $t'_{max} = \frac{4}{3} t_{max}$ |
| Warrants waypoint creation | Yes |

FIG. 14

| | |
|---|---|
| Formulation | $d(\overline{AB}, P_i) \geq d_{min}$ for all POI $P_i$ |
| Scale factor | *scale* |
| Application criteria | To apply to a specific waypoint-POI pair:<br>• $\frac{1}{10} \leq \frac{d(\overline{AB}, P_i)}{scale} \leq \frac{1}{3}$<br>• $\frac{d(\overline{AB}, P_i)}{scale} \leq \frac{1}{10}$ for at least one POI $P_i$<br><br>To apply to all POIs:<br>• $\frac{d(\overline{AB}, P_i)}{scale} \geq \frac{1}{10}$ for all POIs $P_i$ |
| Generalize to a specific waypoint-POI pair | $\frac{d(\overline{A_{new}B_{new}}, P_{new})}{scale_{new}} \geq \min\left(\frac{3}{4} \times \frac{\min\left(\frac{1}{10} \leq \frac{d(\overline{AB}, P_i)}{scale}\right)}{scale}, \frac{1}{3}\right)$ |
| Generalize to waypoint independent of POIs | Same as above, for every new POI $P_{new}$ in the new scenario |
| Relaxation | $d'_{min} = \frac{1}{2} d_{min}$ |
| Warrants waypoint creation | No |

1562

FIG. 15

1664

| | |
|---|---|
| **Formulation** | $L_{min} \leq L \leq L_{max}$ |
| **Scale factor** | *scale* |
| **Application criteria** | Always |
| **Generalize to a specific waypoint-POI pair** | N/A |
| **Generalize to waypoint independent of POIs** | • $\frac{L_{new}}{scale_{new}} \geq \frac{1}{2} \min\left(\frac{L_i}{scale}\right)$<br>• $\frac{L_{new}}{scale_{new}} \leq 2 \max\left(\frac{L_i}{scale}\right)$<br>for all segments $L_i$ in the original scenario |
| **Relaxation** | $L'_{min} = \frac{2}{3} L_{min}$    $L'_{max} = \frac{4}{3} L_{max}$ |
| **Warrants waypoint creation** | No |

FIG. 16

```
Inputs: input_scenario, input_trajectory, output_scenario,
  constraint_library

1) Map new POIs to input POIs                          1766
poi_ratio ← fraction of distance along the POI path
poi_map ← map POIs with closest poi_ratio

2) Generate input constraint graph                     1768
input_graph ← nodes for each input waypoint and POI
input_graph ← add POI-agnostic constraints to
              waypoint nodes for each class in
              constraint_library that applies
input_graph ← add edges between waypoint and POI
              nodes for each class in constraint_library
              that applies to the pair

3) Infer new constraint graph and new waypoints        1770
new_graph ← nodes for each new POI
new_graph ← add unconnected edges to each new_POI
             that copy classes in all edges
             connected to poi_map(new_POI)
waypoint_map ← empty mapping
edge_queue ← edges in new_graph that warrant
              waypoint creation
For each unconnected new_edge in edge_queue
  new_graph ← add node new_waypoint on new_edge
  template_waypoint ← input waypoint connected to the
                       template edge for new_edge
  waypoint_map ← link new_waypoint to template_waypoint
  For each input_edge connected to template_waypoint
    new_graph ← connect new_waypoint to new edges
                 that use input_edge as a template
    edge_queue ← move to the front any edges
                  connected to the POIs that are now
                  connected to new_waypoint
new_waypoints ← order waypoint nodes in new_graph by
                 new POI order
new_waypoints ← insert unconstrained waypoints based
                 on how many precede each waypoint
                 in waypoint_map(new_waypoints)
new_constraints ← constraints in edges of new_graph
```

```
4) Generate initial waypoint positions                 1772
waypoint_positions ← empty for each of new_waypoints
Convert Lasso constraint to Contain constraints
waypoint_positions ← set waypoints linked to POIs to
                      the average of their POI
                      positions
waypoint_positions ← enforce bounds constraints
For each colocated_waypoints with identical Contain
  constraints
  Estimate final path topology around the
    contained POIs
  waypoint_positions ← spread colocated_waypoints
                        tangentially to path
  waypoint_positions ← move colocated_waypoints outward
                        from the POI

5) Optimize waypoint positions                         1774
For specified sets of constraint relaxations
  For constraint_subset = 1...S of specified constraint
  class subsets
    waypoint_positions ← optimize path length given
                          new_constraints
    If solution found and constraint_subset = 1 (all
    are active)
      return waypoint_positions
    If solution found and constraint_subset > 1
      constraint_subset ← constraint_subset - 1
      Use waypoint_positions as next initial path
new_trajectory ← sequence of waypoint_positions
new_trajectory ← copy motion and waypoint durations
                  using waypoint_map
new_trajectory ← mimick orientations if applicable
                  using waypoint_map
```

FIG. 17

ROBOT TRAINING SYSTEM

CROSS-REFERENCE TO RELATED APPLICATIONS

This application claims priority to U.S. Application No. 63/293,331, filed on Dec. 23, 2021, the contents of which is hereby incorporated by reference in its entirety.

BACKGROUND OF THE INVENTION

This invention relates to the training of robotic systems.

As robots become more sophisticated, they are being used to automate increasingly complex tasks. They can traverse hazardous or undesirable locations, sparing people from performing dull, dirty, and dangerous tasks. They are even used to explore the depths of the ocean and the solar system.

These types of tasks require robots to perform a wide variety of tasks in unstructured yet delicate environments without clearly quantifiable objectives. Such environments can make it difficult for robots to explore or evaluate behaviors on their own. Moreover, such autonomous experimentation can be dangerous or damaging, and simulated environments can be difficult to create or overly simplistic. Configuring robots to operate in the real world is therefore challenging.

SUMMARY OF THE INVENTION

Aspects described herein allow a person to intuitively program robots by providing examples to help the robots learn many tasks quickly. The robots are configured to learn from the examples and to generalize to slightly different or even entirely novel scenarios. Aspects leverage the concept of teaching by demonstration, incorporate expert knowledge into the robot's learning process, and at the same time advantageously reduce the barrier for casual users to interact with robots. The person simply performs the task themselves, and then the robot can mimic those actions and even generalize them to new situations. This helps address challenges of deploying robots in environments where training data collection is challenging and helps implicitly convey insights about the task goals without requiring the person to learn the robot's language.

In a general aspect, a method for configuring an electromechanical system to perform a first task includes accepting a specification of the first task, accepting first user input from an operator related to the operator performing the first task, the first user input including a representation of user-referenced points, and forming first control data for causing the system to perform the first task based on the specification of the first task and the first user input.

Aspects may include one or more of the following features. The method may include accepting second user input from the operator as the system performs the task based on the first control data and forming updated first control data based on the second user input. The method may include forming second control data for causing the system to perform a second task, the forming being based at least in part on the specification of the first task, a specification of the second task, the updated first control data, and a number of constraints. The first control data may be updated during the system's performance of the first task using the first control data to generate the updated first control data. The second user input may represent corrections to the robot's performance of the first task. The second user input may include gesture-based input representing corrections to the robot's performance of the first task.

Forming the first control data may include determining first trajectory data for the electromechanical system to follow to complete the first task based on the first user input. Forming the second control data may include determining second trajectory data for the electromechanical system to follow to complete the second task based at least in part the specification of the first task, the specification of the second task, the updated first control data, and the constraints. Determining the second trajectory data may include generalizing an operation of the robot performing the first task such that the robot can complete the second task. The constraints may be expert-defined. The constraints may include a corresponding number of constraint definitions, at least some constraint definitions specifying a restriction on a behavior of the robot during performance of tasks. The constraint definitions may specify restrictions on the behavior of the robot when the robot encounters points of interest during performance of tasks.

The first user input may be measured using a sensor attached to the operator during performance of the first task by the operator. The sensor may include an inertial measurement unit and an electromyography sensor. Accepting the first user input may include using the electromyography sensor to sense muscular activity of the operator as the operator performs the first task. Accepting the first user input may include using the inertial measurement unit to measure changes in a position and orientation of the operator's hand. The first user input may include gesture-based input. At least some of the first user input may include gesture-based input including hand gestures for indicating the user-referenced points as the operator performs the first task.

In another general aspect, a system for configuring an electromechanical system to perform a first task includes a first input for accepting a specification of the first task, second input for a second input for accepting first user input from an operator related to the first task, the first user input including a representation of user-referenced points, and one or more processors configured to form first control data for causing the system to perform the first task based on the specification of the first task and the first user input.

In another general aspect, software stored in a non-transitory computer-readable medium includes instructions for causing a computing system to implement a method for configuring an electromechanical system to perform a first task including accepting a specification of the first task, accepting first user input from an operator related to the first task, the first user input including a representation of user-referenced points, and forming first control data for causing the system to perform the first task based on the specification of the first task and the first user input.

Other features and advantages of the invention are apparent from the following description, and from the claims.

BRIEF DESCRIPTION OF THE DRAWINGS

FIG. 6 is a set of path-centric constraints.

FIG. 7 is a definition of a "contain" constraint.

FIG. 8 is a definition of a "lasso" constraint.

FIG. 9 is a definition of a "bend" constraint.
FIG. 10 is a set of waypoint-centric constraints.
FIG. 11 is a definition of a "pinpoint" constraint.
FIG. 12 is a definition of a "loner" constraint.
FIG. 13 is a set of segment-centric constraints.
FIG. 14 is a definition of a "via" constraint.
FIG. 15 is a definition of a "buffer" constraint.
FIG. 16 is a definition of a "reach" constraint.
FIG. 17 is a generalization algorithm.

DETAILED DESCRIPTION

Figure 1:
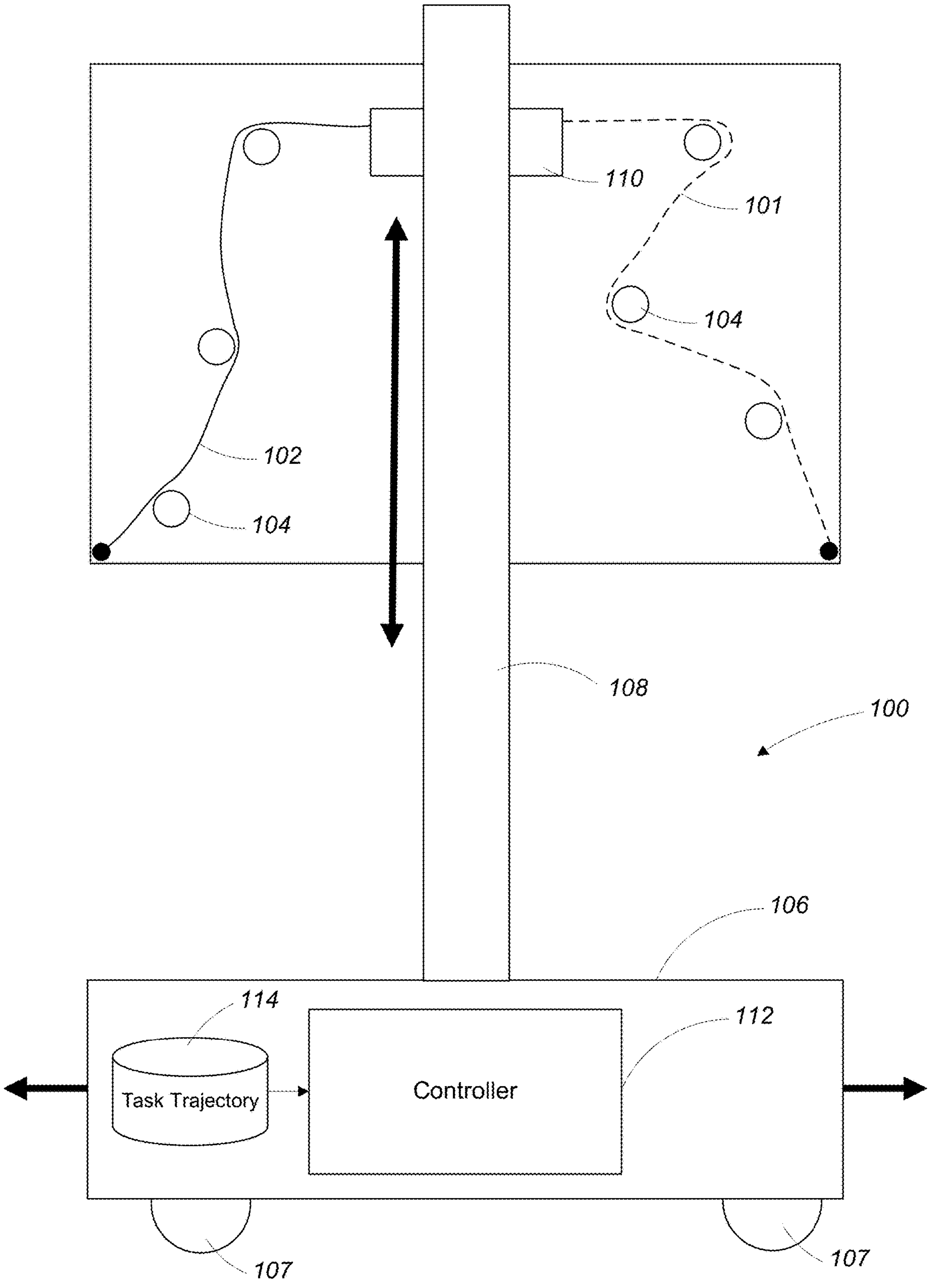
FIG. 1 is a robot performing a task.

Referring to FIG. 1, a robot 100 is configured perform a task including, for example, routing a cable 102 through and around a number of pegs 104 according to a predefined trajectory 101. As is described in greater detail below, the predefined trajectory 101 is determined using information previously learned by first observing a person performing similar routing tasks, and then having a person monitor and correct the robot's behavior as it tries to mimic the person's behavior to perform those same routing tasks. When a new, previously unknown task corresponding to the predefined trajectory 101 is provided, the learned information is used to synthesize the predefined trajectory 101 for the new task.

In this example, the robot 100 includes a base 106, a boom 108, and a routing head 110. The base 106 includes wheels 107 that are controllable to move the robot 100 in a side-to-side direction relative to the pegs 104. The routing head 110 is controllable to move in an up-and-down direction relative to the pegs 104 along the boom 108. In this way, the robot 100 is able to route the cable 102 along two-degrees of freedom relative to the pegs 104.

A controller 112 receives task trajectory data 114 specifying the predefined trajectory 101 as input and controls the movement of the base 106 and the routing head 110 according to the task trajectory data 114 such that the cable 102 is routed through and around the pegs 104.

As is described in greater detail below, the task trajectory data 114 is determined using a three-step process including a demonstration step, an apprenticeship step, and a synthesis step.

In the examples described below, the user wears a sensor on their arm that provides both trajectory data for their arm and allows the user to designated reference points (referred to as "waypoints" or "user-referenced points") that the user designates as being important for performing the task. In some examples, the sensor can detect hand gestures by the user. For example, the location of the reference point might be marked when the user makes a fist. The user also uses hand gestures to provide correction to the robot as it performs tasks. For example, the user might bend their wrist in a particular direction to indicate the robot should move in that direction.

However, it should be noted that any other suitable type of user input can be used to designate reference points and/or to provide correction to the robot. For example, a pushbutton or pedal could be used to designate reference points while the user performs the task and a joystick or "d-pad" control device could be used to provide correction data. Numerous other types of user input are possible.

1 Demonstration Step

Figure 2:
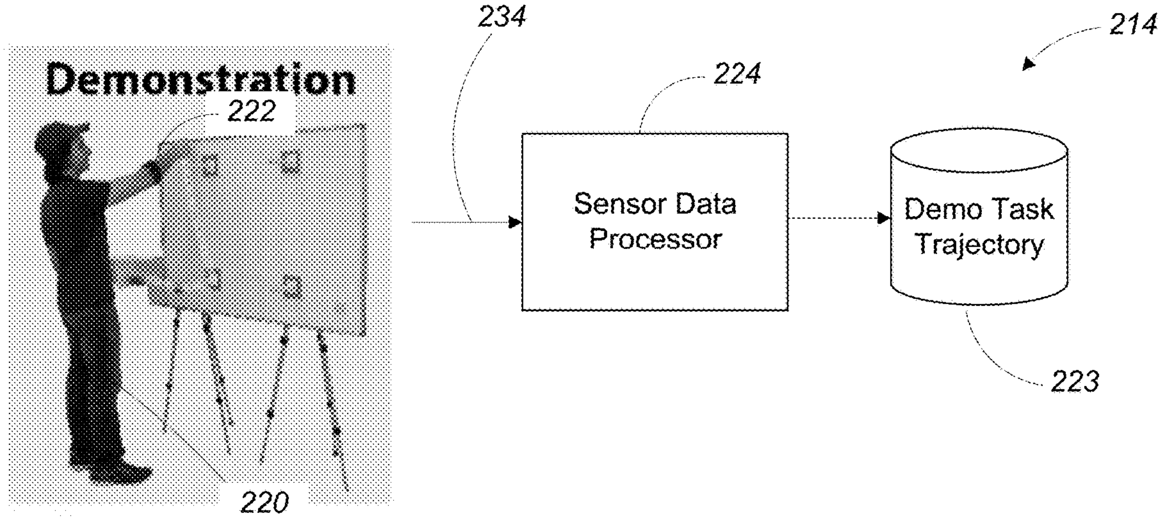
FIG. 2 is a demonstration step used in a robot training system.

Referring to FIG. 2, in a demonstration step 214, a user 220 wears a sensor 222 on their arm as they perform one or more iterations of a demonstration task. In some examples, the sensor 222 includes an inertial measurement unit (IMU) (e.g., including an accelerometer, a gyroscope, and a magnetometer), and an electromyography (EMG) sensor. The IMU is used to sense translation of the person's arm as they perform the task, and the EMG sensor is used to receive input from the user (e.g., to detect muscle signals associated with a user clenching their first to indicate a waypoint in the demonstration task). A sensor data processor 224 receives sensor data from the sensor and processes the sensor data in a motion estimation pipeline to determine a demonstration task trajectory 223 for the demonstration task.

Figure 3:
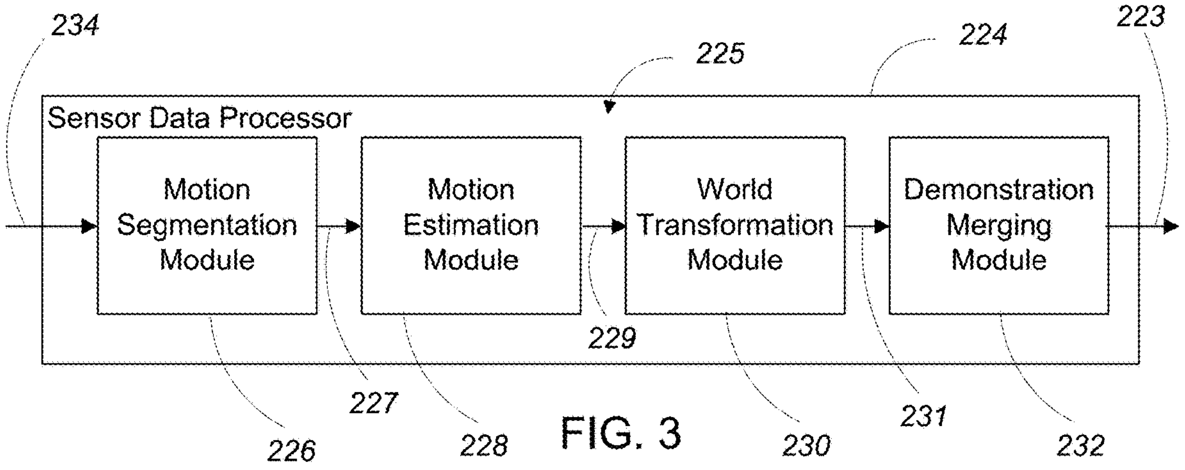
FIG. 3 is a schematic diagram of a sensor data processor.

Referring to FIG. 3, the motion estimation pipeline 225 of the sensor data processor 224 includes a motion segmentation module 226, a motion estimation module 228, a world transformation module 230, and a demonstration merging module 232. As the user performs the demonstration task, sensor data 234 captured by the sensor 222 is provided to the sensor data processor 224.

As is described in greater detail below, the sensor data 234 provided to the motion estimation pipeline 225 is first processed by the motion segmentation module 226, which segments inertial measurement data 225 from the IMU according to gestures performed by the user 220 and detected using muscle activity measured by the EMG sensor. The segmented inertial measurement data 227 is processed by the motion estimation module 228, which integrates the inertial measurement data for each segment to determine estimated motion data 229 representing a trajectory followed by the sensor 222. The estimated motion data 229 is processed by the world transformation module 230, which transforms the estimated motion data 229 to a world frame relevant to the task being performed. In some examples, where multiple demonstrations of the task are performed, the transformed motion data 231 is processed in the demonstration merging module 232, which merges the motion data for multiple demonstrations into a more robust estimate of the demonstration task trajectory 223 followed by the sensor 222 when performing the task.

1.1 Motion Segmentation Module

In general, allowing the user 220 to annotate a demonstration using in-task gestures can be a natural way to augment inertial data with valuable expert knowledge. Incorporating the user into the segmentation process allows the system to divide a demonstration into short motion segments without requiring extensive a priori knowledge about the task or the expected sensor data. Using short motion segments mitigates the impact of drift and noise when processing (i.e., integrating) the inertial measurement data 225 from the IMU of the sensor 222.

In some examples, during demonstrations, the user 220 conducts a series of linear motions between waypoints in a task. At each waypoint, the user performs a physical motion such as clenching their first to indicate an important point that they want the robot to learn. Onsets and offsets of first clenching therefore mark boundaries of segments for inertial processing. It is these boundaries that the motion segmentation module 226 detects when forming the segmented inertial measurement data 227.

In some examples, the motion segmentation module 226 detects when the user makes a first by first estimating a measure of stiffness by multiplying EMG signals corresponding to inner and outer forearm activity, then periodically fits a Gaussian Mixture Model (GMM) to the multiplied signal while storing a short rolling buffer of data from each identified cluster. In systems where first clenching is used to detect boundaries for integration of inertial measurement data, it can be important to avoid missed detections and to determine accurate start and end times. In some examples, the motion segmentation module 226 avoids missed detections and determines accurate start and end times by simulating segmentation on recorded sensor data twice, where the second pass simulation is initialized with the rolling buffers and GMM of the first pass, such that the initial gestures can be reliably identified instead of only used for an initial online calibration. To reliably capture the onset and offset of a first clenching gesture rather than miss a few milliseconds on each side, final detections are made by selecting points where the stiffness estimate is greater than the lowest value detected as a first clench by the GMM. Detected first clenches are then filtered using a sliding window of 0.5 s where at least half of the sliding window is required to contains first clenches for a detection to occur. Filtered detections are shifted in time to compensate for the filtering delay, so first onsets and offsets remain aligned with the inertial measurement data 225.

Finally, the detected first clenches are used to form the segmented inertial measurement data 227 by extracting portions of the inertial measurement data 225 at time intervals between times associated with detected first clenching events. For example, segments of the inertial measurement data begin when a first clenching event ends and end when a first clenching event begins. In some examples, detected segments of the inertial measurement data that last less than 0.75 s are discarded, and assumed to be caused by an extraneous first clenching or by oscillations in the first clenching detections.

1.2 Motion Estimation Module

The segmented inertial measurement data 227 is provided to the motion estimation module 228, which processes the segments of inertial measurement data to generate arbitrary reference frame trajectory data 229 in an arbitrary fixed reference frame (where the arbitrary fixed reference frame is intended to mean an initial reference frame that is not necessarily aligned with the world reference frame). In some examples, the motion estimation module 228 transforms the acceleration data from the IMU into an arbitrary reference frame that is stationary in the real world. For example, the sensor 222 outputs a quaternion pose estimate relative to a fixed reference frame determined upon sensor startup. Rotation matrices associated with the quaternion pose are used to transform the accelerometer data from the sensor frame to the fixed reference frame. In other examples, the pose is computed offline from the sensor data 234 and an arbitrary point such as the first timestep can be used as the reference frame.

With the acceleration data transformed to the arbitrary fixed reference frame, motion estimation module each axis of the acceleration data is smoothed by a 5 Hz lowpass filter, globally detrended by a 0.1 Hz highpass filter, and amplified so its range matches its original range before filtering. In some examples, the amplification helps avoid decreased motion displacements due to the smoothing. The assumption of stationarity at each waypoint as indicated by the first gestures is then used to address local drift and offset. First, acceleration in each axis is averaged during the 0.33 s before the motion start and after the motion end to estimate the offset when the hand is nominally stationary; a linear interpolation between these values is then subtracted from the motion to remove drift. Second, accelerations are shifted so each axis has zero mean across the whole motion; this enforces that there is no net change in velocity after integration, since the hand is assumed to start and end at rest.

The accelerations of each axis are then scaled to convert from g readings to m/s and integrated twice within each motion to compute displacement. Adding the displacement during each motion yields a 3D sequence of waypoints in the arbitrary reference frame. In some examples, to translate from the forearm where the sensor is located to the hand where the cable is held, a vector extending 28 cm along the forearm in the sensor frame, e.g. [28 0 0], is transformed into the fixed frame using the rotation matrices received during each first gesture. These offsets are added to the computed waypoints to generate the arbitrary reference frame trajectory data 229.

In some examples, the task may require walking in a large outdoor area and the motion estimation module 228 accounts for the walking motion. For example, the user 220 makes two fists at each waypoint: one on arrival and one at departure. This produces extra segments that alternately constitute walking motions or task operations at a waypoint such as fastening caution tape to posts. The segments that represent task operations can be excluded from the motion extraction pipeline, so that they do not affect IMU processing during the walking motions. This is done automatically by detecting when the person is walking. A fast Fourier transform (FFT) is performed on each inter-fist segment, and peaks are detected in the frequency domain that are separated from each other by at least 0.5 Hz. A segment is considered to contain walking if the dominant peak is between 0.5 Hz-4 Hz, and if the magnitude of this peak is at least twice as high as all other detected peaks.

Finally, a 0.5 s rolling average filter is first applied to the accelerometer data. This help smooth noise introduced by extra arm motion that might be caused by the walking itself or by holding dynamic objects such as an unrolling spool of caution tape.

1.3 World Transformation Module

The arbitrary reference frame trajectory data 229 from one or more demonstrations is processed by the world transformation module 230 to generate world-frame trajectory data 231 that is converted from the arbitrary reference frame to a task-relevant world frame by either making assumptions about the motion or by requesting additional pose information from the demonstrator. Both of these options are used by the current system, depending on whether adequate constraints about the task are known a priori. In both cases, each demonstration is transformed independently since pose estimations computed from inertial measurements can drift over time but are relatively reliable over the timescale of a single demonstration.

1.3.1 Inferred World Frame Transformation

In some examples, the world transformation module 230 generates the world-frame trajectory data 231 by converting the arbitrary reference frame trajectory data 229 from the arbitrary reference frame to the task-relevant world frame based on assumptions about the user's motion. For example, while performing cable-routing tasks on a vertical board, the user 220 is assumed to move their hand in a roughly planar space and is facing the board. These observations, along with the direction of gravity, are sufficient to automatically transform a trajectory into a world frame aligned with the task plane. The target frame will have the y axis point up, the x axis point to the right along the board, and the z axis point outward towards the person. The below steps outline the transformation process.

Since the user's hand is considered stationary during each first gesture, the direction of gravity in the trajectory's reference frame can be computed as the average negated acceleration vector during these timesteps without additional low-pass filtering. At most 0.5 s from each waypoint is considered in the current implementation, since a long waypoint may indicate that the person was performing additional task activity instead of being stationary. The computed gravity direction at each selected timestep is averaged, and a 3D rotation matrix is applied to the whole trajectory that makes this vector point downward along the global y axis.

As described previously, a vector that points from the forearm to the hand can be transformed from the sensor frame to the fixed frame at each waypoint. These vectors are projected into the x-z plane, and then averaged to indicate the typical direction the arm was pointing around the y-axis. Note that only considering the directions during waypoints yields a more accurate estimate than using all timesteps, since the quaternions computed by the device will not be influenced by spurious accelerations when the hand is stationary. A rotation matrix is then applied to the trajectory that makes the average orientation vector point into the task plane (i.e., along the negative z axis). Note that this will roughly align the trajectory with the task plane but will not be precise since the hand was not directly pointing at the task plane.

Each waypoint of the 3D trajectory is projected into the x-z plane, and then a linear regression computes the best-fit slope and z-intercept. A rotation matrix about the y axis is applied to the trajectory that flattens the slope, so that the best-fit plane of the 3D trajectory is coplanar with the task plane. The trajectory is also shifted by the z-offset. Note that if this step was performed without first rotating such that the arm generally points at the board, the trajectory might be rotated 180 degrees from the desired orientation since the planar assumption alone cannot distinguish between the two solutions.

1.3.2 Relaxing Motion Assumptions by Including a Calibration Pose

In other examples, the world transformation module 230 generates the world-frame trajectory data 231 by converting the arbitrary reference frame trajectory data 229 from the arbitrary reference frame to the task-relevant world frame based on calibration data. For example, although the walking demonstrations are also roughly planar, the rotations that would arise from the planar assumption are redundant with those that would correct the gravity direction. In addition, a typical arm direction cannot be assumed.

To convert the trajectory into a world frame without assumptions on the motion, a calibration process is performed by the world transformation module 230, where the user is asked to point their forearm along a known horizontal axis for a few seconds at the beginning of each demonstration. This orientation is used to compute a rotation matrix that rotates the trajectory about the vertical axis. To rotate about the two horizontal axes, the same procedure as outlined above is used to make the gravity vector point downward. However, a sequence of two rotations is computed explicitly for this step, one about each of the horizontal axes; this avoids unintended rotation about the vertical axis that may arise from a single 3D rotation matrix and that may disrupt the calibration-based rotation.

1.3.3 Starting Position and Hand Orientations

The above-described steps compute a trajectory that is in the desired world reference frame, but still begins at the origin. The world transformation module 230 adds an a priori known starting position to each computed waypoint to account for the starting point of the demonstration.

In addition to the position of each waypoint, the relative rotation of the arm about the forearm axis is also stored. Since a sensor axis is aligned with the forearm axis, this can be simply computed by considering the device's pose estimation at each waypoint and taking the difference between the angles about the forearm axis. This rotation information may or may not be used during task execution, depending on the degrees of freedom of the robot being used.

1.4 Demonstration Merging Module

The demonstration merging module 232 processes the world-frame trajectory data to generate the demonstration task trajectory 223. In general, motions estimated by integrating inertial data can be prone to errors caused by sensor noise, drift, and resolution. The demonstration merging module 232 can address these errors by merging information from multiple demonstrations. However, combining demonstrations into a representative path is nontrivial due to significant variations between them. Motion displacements and timing will vary since a person will not repeat the task exactly the same way, and the processing pipeline will introduce additional variations due to inaccurate displacement estimations or even different numbers of motions if the gesture detection pipeline has false classifications.

In some examples, the demonstration merging module 232 merges multiple world-frame trajectories using a clustering approach that inherently accommodates variations in displacements, timing, and numbers of motions. The approach is motion-centric rather than waypoint-centric, to be consistent with the motion estimation pipeline and to avoid extraction errors propagating throughout a trajectory.

Motions are clustered based on their spatial displacements as well as timing information. Timing information is first normalized to accommodate for potentially large timing differences between demonstrations; the target duration for the merged trajectory is set as the median duration of the input trajectories, and then motion start and end times in each input trajectory are scaled accordingly. In addition to making the timing comparable across input trajectories, it is beneficial for all dimensions of the clustered feature vector to be on similar scales. Motion start and end times are thus scaled again, multiplying by a ratio $\gamma$ given by the median motion displacement divided by the median motion duration.

Each motion from each demonstration is then represented in a 5D feature space $(dx,dy,dz,t_1,t_2)$ where the first three are displacements along each axis and the last two are the processed start and end time indicators. These vectors are clustered using k-means clustering, with the median number of motions in a trajectory as the target number of clusters. In some examples, the default initialization algorithm used is the k-means++ algorithm, and the replication option is set to 100 so it will perform the clustering 100 times and choose the result with the lowest total sum of distances. The squared Euclidean distance metric is used. Once a clustering is found, the results are pruned for outliers in two ways. Firstly, clusters that have fewer points than half of the number of input trajectories are discarded. Secondly, if there are at least 5 input trajectories, then individual points are discarded if they are farther from their cluster's centroid than the median distance from other points in the cluster to the centroid. After these two filters are performed, the clustering is repeated. This process continues until no outliers are removed or until no clustering solution can be found; in the latter case, the filters are removed and the solution with outliers is accepted.

The centroid of each cluster is then extracted as the set of merged motions to use. The last two dimensions of the centroid vectors are divided by $\gamma$ to restore proper scaling of the start and end times, and motions are sorted by the end time since the clusters may be in random order. The first three dimensions of the centroid vectors are used as displacements directly. These displacements are cumulatively summed to yield a sequence of waypoints. Finally, the whole trajectory is shifted from starting at the origin to starting at the median starting position among input demonstrations.

Although not included in the feature vector, the arm orientations stored along with each estimated motion are also merged. Within each cluster of motions, an average angular displacement is computed from the angular displacements originally associated with those motions. These angular displacements can be summed to yield a sequence of arm angles.

This process yields a merged 3D trajectory given an arbitrary number of 3D motion sequences extracted from the demonstrations. Since all of the tasks currently considered are performed in 2D spaces, the merged motions and waypoints are projected into the relevant vertical or horizontal plane to generate the final 2D path for the robot to follow—the demonstration task trajectory 223.

2 Apprenticeship Step

Figure 4:
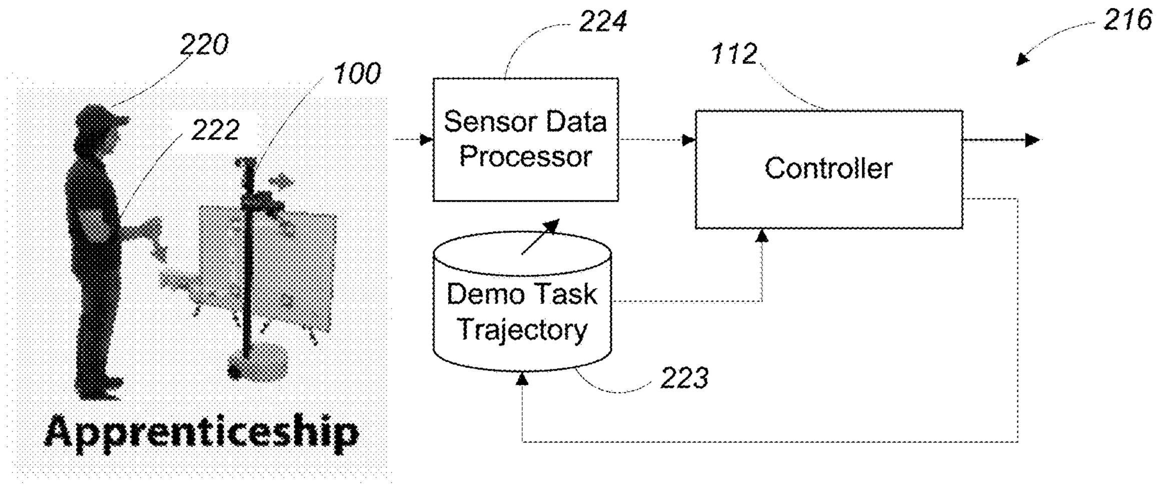
FIG. 4 is an apprenticeship step used in a robot training system.

Referring to FIG. 4, after the demonstration step 214 is complete, the apprenticeship step 216 commences. In the apprenticeship step 216, the demonstration task trajectory 223 is provided to the controller 112 of the robot 100 and the robot 100 attempts to mimic the user's motions in performing the task using the task trajectory 223. As the robot 100 performs the task, the user 220 provides feedback to the controller 112 using the sensor 222. For example, the user may use first clenching, wrist flexion, and other movements detectable by the sensor 222 to indicate and correct errors in the robot's movements. As the user corrects the robot's movements, the demonstration task trajectory 223 is updated and refined according to the user feedback.

2.1 Intervention Paradigm

In the apprenticeship step 216, the robot 100 follows the demonstration task trajectory 223 until the 220 intervenes, at which point the robot will stop and wait for adjustment commands. The person can then make gestures to move the robot to the desired position. Once they are satisfied with the position, the controller 112 updates the stored trajectory; the previous waypoint or the next waypoint is set to the robot's current position, depending on whether the robot was less than halfway or more than halfway to the next waypoint when the intervention occurred. The adjustment is then propagated to all future waypoints in the trajectory. Adjustments are thus motion-centric rather than waypoint-centric, so that updating the displacement of one motion segment shifts all subsequent waypoints. This is consistent with the trajectory extraction pipeline, which estimates each motion segment independently.

In some examples, in addition to explicit adjustments received from the user 220, trajectories are also automatically adjusted to obey workspace bounds. Before starting each motion, the target destination is clamped to bounds that are provided a priori. If the target is moved as a result, the adjustment is propagated to subsequent waypoints of the trajectory as if it were an explicit correction. Note that this clamping is done for a single target waypoint before starting each motion instead of clamping all waypoints before beginning apprenticeship, since a user's adjustments may affect whether waypoints require clamping.

In some examples, similar to the automatic spatial adjustments, the motion timing may also be implicitly updated as needed to accommodate the robot's speed. The robot will attempt to complete a motion in the duration inferred from demonstrations, but if its maximum speed is too slow to do so then the duration of that motion segment is extended accordingly. In some examples, the adjustment does not require any action from the user, although in other examples, additional gestures are used to explicitly adjust timing.

2.2 Robot Status

In some examples, the robot 100 uses indicators to convey the current task status to the user 220. For example, a front of the robot faces the task to indicate autonomous execution. Once an intervention is detected, the robot turns to a predefined angle roughly aimed at the user 220 to indicate that they are waiting for commands. The robot may use a screen to display an embarrassed face or may plays a brief sound to indicate the robot is awaiting a command. When the robot decides that the intervention has ended, it faces task once more. The robot may display a smiling face on its screen or make a nodding motion. In some examples, the robot 100 indicates a current waypoint index using a display. In some examples, when the entire trajectory is completed, the robot nods its head three times.

2.3 Gesture Vocabulary

A vocabulary of gestures can be sensed by the sensor 222 and identified using the sensor data processor 224. The gestures are mapped to commands that allow for interrupting the robot and then adjusting its position.

A first clenching gesture while the robot is performing the task begins an intervention and stops all robot motion. If EMG sensors are worn on the upper arm, then arm stiffening can also be used to interrupt the robot. Once the desired adjustments have been made by the user 220, a subsequent first clenching gesture ends the intervention, and the robot resumes autonomous mode. Alternatively, an intervention also ends if no gestures are detected for 30 s.

A wrist extension and flexion indicate directions for the robot to move during an intervention (i.e., to correct the robot's position). These motions wave the hand left or right if the palm is held vertically, and up or down if the palm is held horizontally. These four gestures can therefore move the robot anywhere in the 2D task plane. In some examples, each gesture causes a discrete motion—the robot moves by 5 cm during cable-routing tasks and 15 cm during outdoor tasks. In other examples, the robot moves continuously in response to a gesture until a stop gesture is received, enabling continuous adjustments and reduce the number of required gestures.

Wrist rotations cause the robot's gripper to rotate clockwise or counterclockwise (i.e., to correct the robot's orientation). In some examples, each gesture causes a wrist rotation of 10 degrees. In other examples, rotations are mapped to other orientation aspects such as a camera angle at survey locations.

3 Synthesis Step

Figure 5:
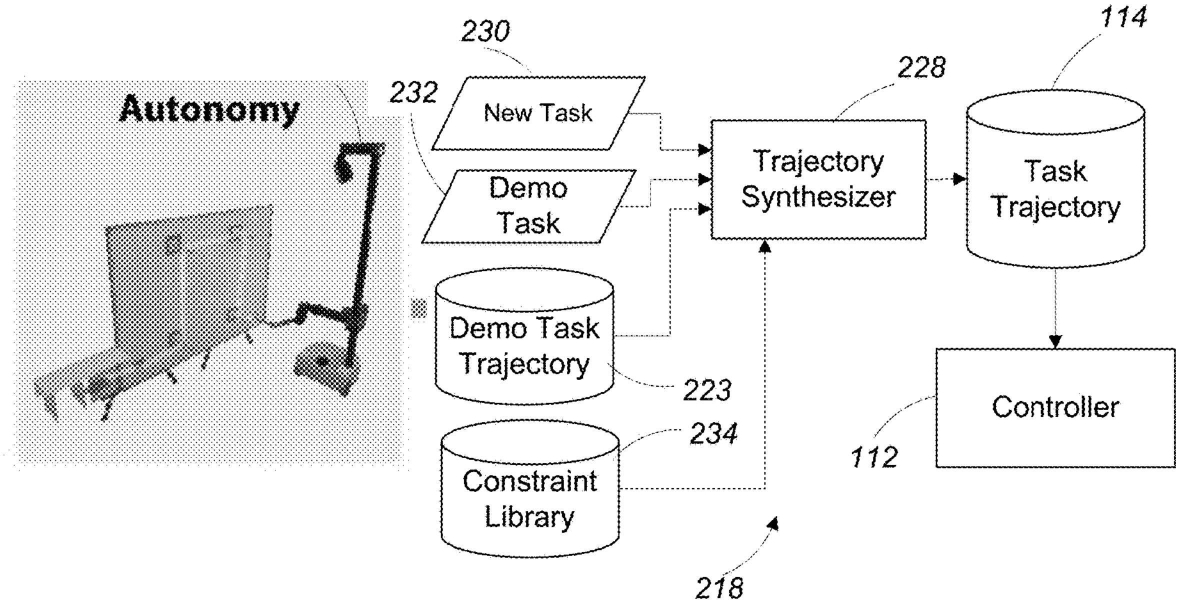
FIG. 5 is a synthesis step used in a robot training system.

Referring to FIG. 5, after the demonstration step 214 is complete, the synthesis step 218 commences. In the synthesis step 216, a trajectory synthesizer 228 receives a new task 230 as input and processes the new task 230 according to a characterization of the demonstration task 232 (e.g., data characterizing the configuration of the pegs in the demonstration task), the demo task trajectory 226, and a constraint library 234 to generate the task trajectory data 114 (i.e., the trajectory data used by the robot 100 in FIG. 1). The new task 230 includes data characterizing a new configuration of pegs to route a cable through and around and the constraint library 234 includes expert-defined constraints (e.g., defining heuristics regarding how the cable performs in different scenarios around the pegs such as bending at acute or obtuse angles), described in greater detail below.

Very generally, the trajectory synthesizer 228 is configured to generalize information from the demonstration task trajectory 226 using the characterization of the demonstration task 232 and the constraint library 234 to determine the task trajectory data 114 for the new task 230.

3.1 Generalization Pipeline

The trajectory synthesizer 228 implements a generalization pipeline that enables the robot 100 to generalize from the demonstration scenario to new configurations. Since training a machine learning model to generalize using limited input data is difficult, expert knowledge is embedded within the system as the constraint library 234. In particular, the constraint library 234 is formed by an expert who defines a library of constraints that describe how a task-relevant trajectory might behave around points of interest such as pegs.

The generalization pipeline assumes that the following properties are known: (1) Locations of points of interest, and an ordering among them that reflects the sequence in which they should be 'visited' by the trajectory during a task are known. (2) The starting and ending positions of a trajectory. These are simply the first and last waypoints for an existing trajectory and are desired targets for a new trajectory. They can also be associated with a tolerance to represent regions rather than points. (3) Bounds on the workspace of the trajectory.

Given an input scenario (i.e., the demonstration task 232) with an existing demonstration task trajectory 223, and a target scenario (i.e., the new task 230) without a trajectory, the trajectory synthesizer 228 synthesizes a trajectory for the target scenario that mimics the style of the demonstration task trajectory. The scenarios may involve different numbers and positions of points of interest, have different starting and ending positions, and/or have different workspace sizes. The expert-defined constraint classes determine the types of behaviors that are copied; they may be local relationships such as the path making an acute angle around a peg, or more global topological properties such as encompassing the convex hull of all pegs. The system uses this library to describe how the existing trajectory behaves around points of interest, and then uses those relationships as a template to generate a set of constraints on the new trajectory. A nonlinear optimizer can then find waypoint positions that satisfy these constraints.

3.2 Constraint Library

In some examples, the constraint library 234 includes a number of constraint classes. Each constraint class in the library has three main functions: describe existing scenarios, generalize to new scenarios, and evaluate whether it is satisfied during optimization iterations.

The "describe" function of a constraint class is used to determine whether the constraint applies to each waypoint or segment within an existing trajectory. Depending on the type of constraint, it may apply with respect to a specific point of interest (POI, such as a waypoint being near a particular POI), with respect to all POIs (such as a waypoint being far from all POIs), or independently of any POIs (such as a segment having a minimum length).

Each constraint class can also specify whether the existence of the constraint warrants inserting a new waypoint for it when synthesizing a trajectory for a new scenario. For example, a constraint that checks whether the path goes around a POI reflects a critical behavior about the trajectory and therefore a waypoint should be created for it if needed, while a constraint that simply enforces a minimum segment length would only act on existing segments and not require adding new ones.

The "generalize" function of a constraint class is used to tune parameters of the constraint based on an existing trajectory and then to instantiate the constraint class in a new scenario. These parameters are typically inferred relative to the scale of the overall scenario, so that it can generalize to scenarios of different sizes. In addition, each constraint class can optionally provide a method to relax the constraint in case no feasible set of waypoints has been found during optimization. Typically, this will involve adjusting the tuned parameters to allow more freedom in waypoint locations.

The "evaluate" function of a constraint class is used once a constraint classes is instantiated for a new scenario. The function is formulated such that it is compatible with a nonlinear constrained optimization solver. In some examples, the evaluate functions are differentiable functions that indicate whether or not the constraint is satisfied for a specified set of waypoint positions. In some examples, each of the constraint types scales the evaluation functions by a reference level, to help keep evaluations from all constraint classes within comparable ranges.

Many of the classes compute a reference length scale for a scenario as a building block, such that the parameterizations can apply to scenarios of different sizes; this is done by finding the median distance between successive POIs in the specified ordering, or if there is only one POI then by averaging its x and y coordinates.

Referring to FIGS. 6-16, the constraint library 234 includes a variety of expert-defined classes to describe how a path might behave relative to points of interest in the environment. Examples described herein focus on cable-routing and related tasks, but the library can be extended to other tasks. Each class can infer whether it applies to a given waypoint, provide parameters for generalizing to a new scenario, and be formulated as for a constrained nonlinear program solver.

3.2.1 Path-Centric Constraints

FIG. 6 shows examples of path-centric constraints such as contain constraints 650, lasso constraints 652, and bend constraints 654.

A contain constraint 650 is used to go around a POI. This constraint class aims to represent when the trajectory bends around a POI; conceptually, if the POI is a peg, a string should press against it when pulled taut after following the trajectory. The constraint applies to a given waypoint-POI pair if the angle formed by the path at that waypoint encompasses the POI, if the POI is within a reasonable distance from the waypoint relative to the surrounding path segments, and if the POI is not too close to the waypoint such that it is ambiguous whether the waypoint is meant to be collocated with the POI instead. The distance criteria aim to allow a waypoint angle to contain multiple POIs if appropriate, while not over-constraining the trajectory by containing too many POIs. When adding a Contain constraint in a new scenario, a buffer distance between the waypoint and POI will also be enforced since the containment criteria becomes ambiguous at close distances.

The constraint is formulated for optimization as two inequalities, with each one checking that two-cross products have the same sign. Conceptually, one inequality ensures that the previous segment would be rotated about the central waypoint in the same direction to reach the POI as it would be to reach the next segment. The other inequality is analogous for the next segment. Together, these enforce that the POI is within the area swept out by rotating one segment to the other segment via the angle between them that is less than 180 degrees. Gradients of these inequalities with respect to the three waypoints of interest are computed symbolically. To scale the constraint values to have an order of magnitude close to 1, it can be noted that each inequality is the product of two cross products, each of which represents the area of the parallelogram defined by the crossed entity. The table shown in FIG. 7 is a definition 750 of a contain constraint 650, where the definition uses the notation from the contain constraint 650 shown in FIG. 6. The expression of FIG. 7 arises by assuming each segment length is of similar magnitude to the scenario scale reference, the waypoint-POI distance is shorter than a typical segment by an empirically representative factor, and the expected value of $|\sin(\theta)|$ is ~0.6.

A "lasso" constraint 652 is used to go around all POIs in a group of POIs. Constraints such as going around a peg are useful to describe local behaviors around individual POIs, but some tasks may require more global topological constraints. To exemplify this, the Lasso class builds upon the Contain class—it aims to ensure that the path as a whole goes around the convex hull of all POIs. The table shown in FIG. 8 is a definition 852 of a lasso constraint. Its formulation leverages the formulation used by the Contain class. It will check whether the cross-product inequalities are satisfied for all POIs at every waypoint, without considering any of the distance criteria. Conceptually, it checks whether the path at each waypoint contains all of the POIs if the path segments were rays originating from the waypoint instead of finite segments.

A "bend" constraint 654 restricts how sharply the trajectory can turn at a waypoint or ensure that it bends by an appreciable amount. In some examples, bounds are inferred from existing trajectories. In other examples, the bend constraint constraints new trajectories to have an angle at each waypoint between 10 and 170 degrees.

The table shown in FIG. 9 is a definition 954 of a bend constraint 654. The definition shows that, instead of computing path angles directly, the formulation operates on cosines of the angles. This reduces complexity of computing constraint gradients and maintains correctness since cosine is monotonic on the interval [0, 180] degrees. Note that the cosine of the angle between two segments as computed via the dot product uses the angle that is between 0 and 180 degrees, and the specified bounds on the angle are also assumed to be between 0 and 180 degrees. Gradients of the inequalities with respect to each of the three waypoints comprising the angle are computed symbolically. No scaling is applied to the constraints, since the inequalities subtract two cosines and are thus already in the range [−2 2].

3.2.2 Waypoint-Centric Constraints

FIG. 10 shows examples of waypoint-centric constraints such as "pinpoint" constraints 1056 and "loner" constraints 1058.

Pinpoint constraints 1056 are associated with locations that the robot needs to visit (e.g., survey locations). The pinpoint location class enforces that a waypoint along the robot's trajectory is within a certain distance of a particular point of interest.

The table shown in FIG. 11 is a definition 1156 of a pinpoint constraint. In some examples, to improve optimization performance, this constraint is formulated as a boundary constraint rather than an inequality constraint. It adds bounds on the optimizer's search space such that each coordinate of the waypoint is within a desired tolerance of the waypoint. It therefore enforces that the waypoint is within a box around the linked POI. If multiple Pinpoint constraints are added on a waypoint, the bounds are merged in each axis independently. If the resulting bounds are infeasible, the most recently added constraint is removed.

Loner constraints 1058 are associated with waypoints that are far away from some or all of the other POIs. In addition to passing close by some POIs, a task may also require that the path remain far from all POIs in certain spots. Towards this end, the Loner constraint 1058 class enforces a minimum distance between a waypoint and some or all POIs.

The table shown in FIG. 12 is a definition 1258 of a loner constraint. In some examples, the constraint is formulated as a nonlinear inequality constraint for each POI in the new task. Although using squared distances would reduce computational complexity, using true distances facilitates scaling the constraint values to be comparable to other constraints in the optimization problem.

3.2.3 Segment-Centric Constraints

FIG. 13 shows examples of segment-centric constraints such as "via" constraints 1360, "buffer" constraints 1362, and "reach" constraints 1364.

Via constraints 1360 are associated situations where a task requires the trajectory to pass through a POI without stopping. The Via class addresses this by enforcing that the central portion of a segment of the trajectory is close to a POI.

The table shown in FIG. 14 is a definition 1460 of a via constraint. In some examples, the via constraint is formulated as two nonlinear inequalities: one to enforce a maximum distance to the POI, and one to enforce that the closest separation is within the central region of the segment. Both of these leverages the determination of which point along the segment is closest to the POI, as a ratio of the segment length. This is computed as $$t_{raw} = \frac{\langle \overline{AB}, \overline{AP} \rangle}{|AB|^2}$$

clamped to be between 0 and 1. However, a smooth clamping function is used to make the formulation differentiable and aid gradient descent during optimization. This clamping function is constructed as follows:

$$\text{step\_up\_at\_zero}(x) = \frac{1}{1 + e^{-100x}}$$

$$\text{step\_up\_at\_one}(x) = \frac{1}{1 + e^{-100(x-1)}}$$

$$\text{step\_down\_at\_one}(x) = \frac{1}{1 + e^{100(x-1)}}$$

$$\text{clamp}(x) = [\text{step\_up\_at\_zero}(x) \times \text{step\_down\_at\_one}(x)] + \text{step\_up\_at\_one}(x)$$

$$t = \text{clamp}(t_{raw})$$

This provides a ratio between 0 and 1 that indicates which point along the segment is closest to the POI. A constraint to keep the POI in a central region of the segment can then place bounds on this ratio. Both lower and upper bounds can be combined into a single inequality by checking that $(t-t_{min})$ and $(t_{max}-t)$ have the same sign; assuming $t_{min}<t_{max}$, both expressions cannot be simultaneously negative and thus they must both be positive if their product is positive.

In addition to using t directly, the closest point can be computed as (ax+|ax=bx|t,ay+|ay−by|t). The distance between this point and the POI can then be constrained. Gradients of the final formulation for both types of constraints are computed symbolically. The table shown in FIG. 14 is a definition 1460 of a via constraint.

In some examples, when a POI is a physical object and collisions with it should be avoided, tasks may require that the robot remain a certain distance away from POIs throughout execution. The buffer constraint 1362 class addresses this by enforcing a minimum distance between a path segment and a POI. Note that since the entire segment must be a certain distance from the POI, this also implicitly constrains the waypoints defining the segment to be sufficiently far from the POI.

Since some tasks may treat all POIs the same while in other tasks only certain POIs would cause collisions, the Buffer constraint can apply between a segment and a specific POI or between a segment and all POIs. To avoid overly constraining the optimization problem, enforcing a buffer distance from all POIs will take precedence over having a buffer distance to a specific POI; the Buffer constraint will only consider linking a specific segment-POI pair if the segment is far from that POI but not far from every POI. In addition, it will only link a specific segment-POI pair if the segment is not too far from the POI, since otherwise the segment may not have a meaningful relationship with the POI.

The table shown in FIG. 15 is a definition 1562 of a buffer constraint. The formulation for optimization uses the same distance computation outlined above for the Via constraint class. A minimum distance instead of a maximum distance is enforced though, and no bounds are placed on t.

Reach constraints 1364 are associated with situations trivially short or inconveniently long motions need to be avoided. The reach constraint 1364 constrains the length of each path segment can be constrained within a reasonable range. This range can be inferred from the segment lengths of an existing trajectory, and parameterized relative to the overall scale of the scenario.

The table shown in FIG. 16 is a definition 1634 of a reach constraint. The reach class formulates this concept by considering the lengths of each segment in an existing trajectory relative to the reference scale of the input scenario. It then enforces that new segment lengths in a synthesized trajectory, relative to the reference scale of the target scenario, are within a certain range of this benchmark. Similar to the Loner constraint class, distances are constrained directly instead of using squared distances to help keep constraint values within reasonable ranges. Gradients are also computed analytically. Minimum and/or maximum bounds can be specified on the segment lengths.

3.3 Generalization Algorithm

Given the demonstration task trajectory 223 that completes the desired task on an existing scenario, the trajectory synthesizer 228 implements a generalization algorithm that synthesizes the task trajectory 114 for a novel, new task 230. In general, the generalization algorithm first assigns each POI in the new task 230 to a POI in the input example that it should mimic. It then consults the constraint library 234 to construct a constraint graph representing how waypoints and path segments relate to POIs in the input example and uses this template along with the POI mapping to generate a constraint graph for the new task 230. The number of new waypoints needed is implicitly determined during this process. A constrained nonlinear optimization formulation can then determine waypoint locations that satisfy the generated constraints.

Figure 18:
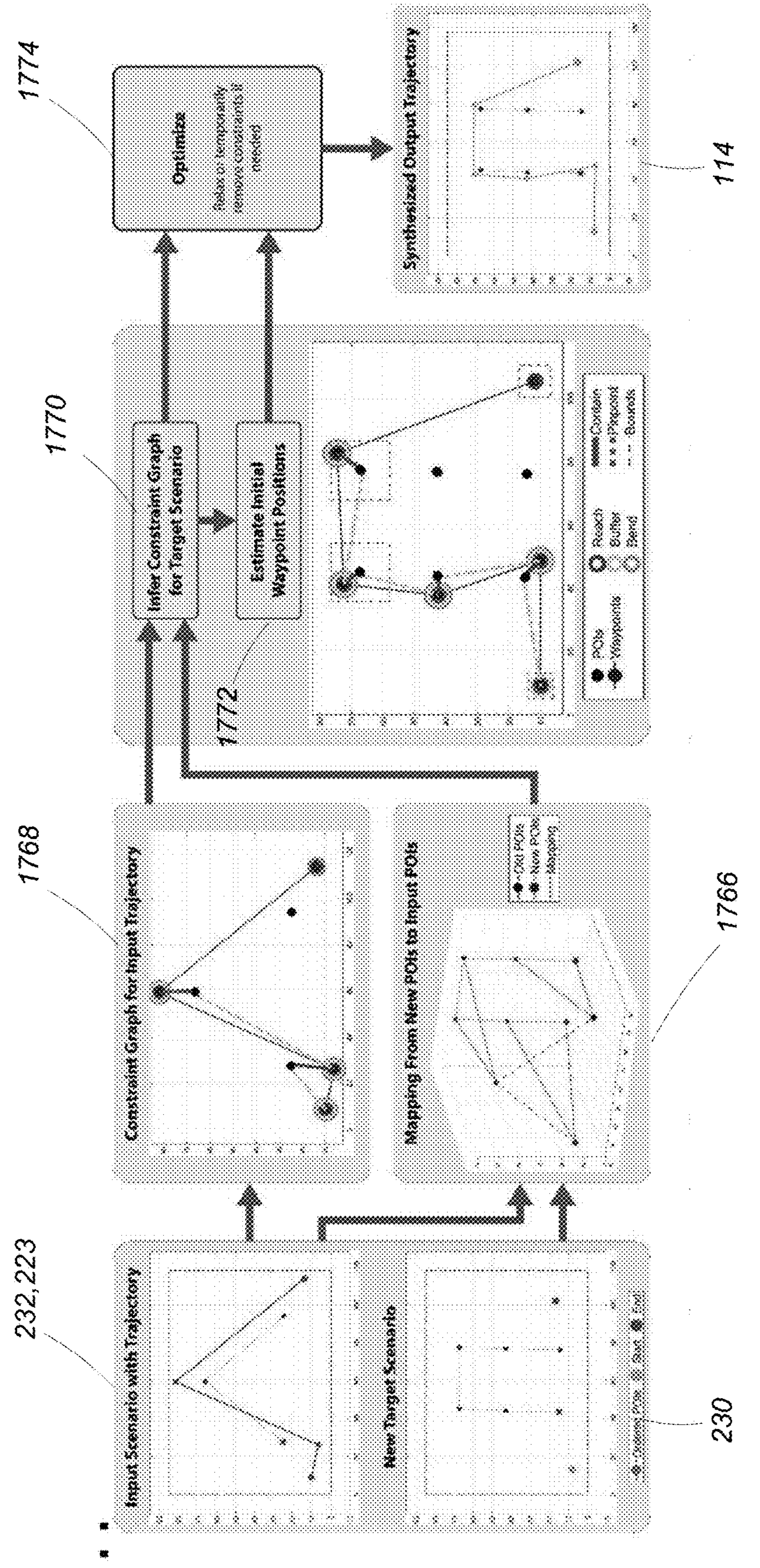
FIG. 18 is a schematic block diagram of the generalization algorithm of FIG. 17.

Referring to FIGS. 17 and 18, in some examples, the generalization algorithm includes five steps: a first step 1766 where new POIs are mapped to input POIs, a second step 1768 where an input constraint graph is generated, a third step 1770 where a new constraint graph and new waypoints are inferred, a fourth step 1772 where initial waypoint positions are generated, and a fifth step 1774 where waypoint positions are optimized.

3.3.1 First Step: Map New POIs to Input POIs to Use as Templates

In the first step 1766, each POI in the new task 230 will use a POI in the demonstration task 232 as a template for how the trajectory should behave around it. In some examples, a provided ordering of the POIs is used to determine this mapping. By connecting the POIs within a task in the specified visitation sequence, each one can be represented by its distance ratio along that path:

$$r_i = \frac{\sum_{j=1}^{i-1} |\overline{P_j P_{j+1}}|}{\sum_{j=1}^{N-1} |\overline{P_j P_{j+1}}|}$$

Where N is the number of POIs. Each new POI is then matched with the input POI that has the most similar path ratio in their respective scenarios. Note that each new POI is matched with exactly one input POI, but each input POI may be matched with multiple new POIs.

3.3.2 Second Step: Generate Constraint Graph for the Demonstration Task

In the second step 1768, a constraint graph is generated for the demonstration task. To describe how the demonstration task trajectory 223 relates to the POIs, each constraint class of the constraint library 234 can be queried to see if it applies to each waypoint or segment of the demonstration task data. The resulting collection of constraints can be conceptualized as a graph where waypoints and POIs are nodes, and edges connect pairs that have at least one active pairwise constraint. Each edge may represent multiple constraints if multiple classes applied to that waypoint-POI pair. Constraints that apply to a waypoint independently of any specific POI can be visualized as properties stored within waypoint nodes.

3.3.3 Third Step: Infer Constraint Graph for the New Task and New Waypoints

In the third step 1770, an analogous constraint graph for the new task 230 is inferred by leveraging both the constraint graph for the demonstration task and the mapping between the demonstration task POIs and the new task POIs. The algorithm creates a graph with a node for each new POI and generates a list of edges that are expected to connect to the new POI nodes. Waypoint nodes can then be inserted as needed to satisfy the edges. This yields the number of new waypoints needed, and a set of constraints linking them to the new POIs. Along the way, it also builds a mapping between waypoints of the new task 230 and waypoints of the demonstration task 232 such that each waypoint essentially mimics the behavior of a demonstration task waypoint.

Edges are added to the new graph for each new POI node by copying the edges connected to the input POI that is mapped as its template. Each edge represents a link to a future waypoint node but is currently unfulfilled since no waypoint nodes have been created. Note that a single new waypoint may ultimately connect to multiple edges. Each edge records the constraint classes that the input edge represented, along with which input waypoint and POI were linked by the input edge.

The graph for the new task is completed by visiting unconnected edges and adding waypoints as needed, in a roughly depth-first order to help preserve the shape of the input graph. Initially, a queue of edges to visit is populated with all new edges that have at least one constraint class marked as warranting waypoint creation. The queue is ordered by considering the new POI and the input waypoint stored with each edge; it is sorted first by the provided new POI order, and then by the input waypoint path sequence.

Each iteration of the algorithm will remove the top edge of the queue. A waypoint node is added to the graph for the new task, and the edge is connected to it. This new waypoint is mapped to the input waypoint that originally caused that edge to be created and will seek to mimic that waypoint's behavior. To do so, the algorithm looks for other input POIs that were connected to that input waypoint in the input graph. It then finds all unconnected edges in the new graph that were inspired by those links and connects them to the newly inserted waypoint node. This results in the new waypoint having constraint edges to new task POIs that are analogous to the edges connected to the input waypoint that it is copying as a template, according to the mapping between new task POIs and demonstration task POIs.

One exception arises if there are other new task POIs mapped to same demonstration task POIs as the one in the edge that inspired the waypoint insertion, and if some of the additional edges would connect to a new POI later in the POI ordering. In this case, only the last new POI in the set will have its waypoint linked with the later POI; those additional edges are ignored for the other new POIs in the set, and treated separately in future iterations by adding new waypoints. This helps avoid having multiple sequential new POIs that copy the same input POI all being transitively linked to a new POI later in the ordering, which could cause twisting in the path and unwieldy sets of constraints.

Finally, the queue of edges to consider is updated. All edges that were just connected to the inserted waypoint is removed from the queue. In addition, all unconnected edges that are associated with the new POIs now linked to the inserted waypoint is moved to the top of the queue. Thus, the new task graph is traversed in a roughly depth-first order while it is being created.

This process ends when all edges in the new task graph have been connected. The waypoint nodes then represent waypoints that should be placed in the new trajectory. These can be sorted into a path ordering according to the visitation order of the new POIs they are linked to, and then according to the order of the input waypoints they are mimicking.

The generated constraint graph for the new task yields a collection of new waypoints that handles all of the expected pairwise constraints between waypoints and POIs. However, the demonstration task trajectory 223 may also have waypoints that were not specifically constrained to particular POIs; they may have constraints that apply to all POIs, or they may not have any constraints. These may still be important for the trajectory to achieve its desired shape and for the optimization formulation to have sufficient freedom, so corresponding new waypoints can now be inserted. There are two cases that are considered for this process.

Firstly, starting and ending waypoints are added to the new task trajectory if they have not been added automatically. This would imply that the input starting and ending waypoints did not have constraints on them that warrant waypoint creation.

Secondly, all remaining input waypoints without specific POI constraints are accommodated. The system will iterate through each new waypoint already inserted and consider the input waypoint that it is mimicking. It will count the number of unconstrained waypoints between this input waypoint and the previous constrained input waypoint, and then add that many unconstrained waypoints to the new task trajectory before the new waypoint being considered. It will also count the number of unconstrained waypoints at the end of the input trajectory and append that many to the new trajectory. Each new waypoint inserted by this process is recorded as mapped to the corresponding input waypoint that inspired its insertion.

After determining the list of new waypoints and a set of constraint classes that may link them to specific POIs in the new scenario, a next step is to add POI-independent constraints. For each new waypoint, the system will consider the input waypoint it is mimicking and copy any POI-independent constraint classes associated with it.

Since the positions of the starting and ending positions are constrained by pre-specified bounds, additional constraints on their positions may be infeasible. The system therefore removes any waypoint-centric constraint classes that have been added on the starting or ending position. Note that segment-centric constraints such as Buffer constraints can remain.

3.3.4 Fourth Step: Generate Initial Waypoint Positions

In the fourth step 1722, initial waypoint positions are for the new task trajectory are determined. Finding a feasible trajectory via optimization can often be quite sensitive to the initial conditions. The current framework generates initial waypoint positions by placing waypoints near POIs to which they are constrained. In particular, contain constraints suggest a desired path topology near the relevant POIs, so the initial guess is refined to make it more likely that the path goes around those POIs.

In the algorithm, each waypoint with POI-specific constraints is first moved to the average position of its linked POIs. Only waypoint-centric constraint classes are considered if any are present for a waypoint, but otherwise all POI-specific constraint classes can be considered. Any bounds constraints will then be enforced; if an assigned waypoint position violates bounds constraints on that waypoint, the violating coordinate is clamped accordingly. In addition, start and end waypoints are assigned to the center of the specified start and end regions.

Before applying the above procedure, however, a preprocessing step checks if the global Lasso constraint class is active on the trajectory and if so, converts it to pairwise Contain constraints. Since linking each waypoint to every POI would result in all waypoints being placed at the average POI position, each one is instead only linked with a few selected POIs such that the waypoints are spread out along the convex hull. To do this, a line is first drawn between the starting and ending position of the trajectory and the half-plane that contains the majority of the POIs is considered; it is assumed that the desired trajectory will follow that route to encompass the POIs. A convex hull is then computed for the set of points comprising all POIs in the chosen half-plane as well as the starting and ending positions. The POIs that lie on this convex hull are extracted as the support POIs. Waypoints are then paired with these support POIs according to the waypoint ordering and then the POI ordering. Waypoints may be paired with multiple POIs if needed, such that every support POI is paired with at least one waypoint. A contain constraint is added for each of these pairs, and the original Lasso constraint is removed. Note that these constraints are only for the purposes of generating an initial path, and the original constraint graph will not be altered for optimization purposes.

If multiple waypoints had Contain constraints with the same set of POIs, then they will have been located at the same position. These can be spread out now in a path-relevant order, instead of allowing the optimization solver to potentially move them in a way that causes looping and twisting.

To compute a reasonable direction along which to spread waypoints that contain the same POI, a local reference path can be created that aims to estimate how the final optimized trajectory will bend around that POI. The waypoints can then be spread along a line that is tangent to the path at that bend; this will typically spread out the waypoints while maintaining the spirit of the Contain constraint. If the collocated waypoints contain the same set of multiple POIs, then this procedure is done for each contained POI in the set and the resulting spreading directions are averaged.

The computed reference path that aims to anticipate local topology of the optimized path around a POI will comprise 3 points:

1) The first reference point is the first waypoint that is before the collocated waypoints, has a position assigned already, and either contains no POIs or contains at least one POI prior to the current POI. However, if the collocated waypoints contain multiple POIs and the current POI is not the first one in the set, then the first reference point is instead the previous POI in the set.
2) The center point of the reference path is the current location of the collocated waypoints.
3) The last reference point is computed analogously to the first point, except looking forward instead of backwards; it will either be the next POI in the set or the next waypoint that contains no POIs or a future POI.

For each reference path, a line segment that bisects its angle is first computed. To do this, each of the two segments in the path is normalized to unit length, conceptually placing them on the unit circle centered at the middle reference point. Averaging their coordinates computes the point that is halfway between them, and which also bisects the original angle when connected to the middle reference point.

The spreading direction is then determined by constructing a line segment of unit length that starts at the middle reference point and that is perpendicular to the bisecting direction.

The above process is applied to each contained POI in the set, and the spreading directions are averaged. A line segment is then constructed that is oriented in this direction, that is centered at the point where the waypoints are collocated, and that has length ¼ (the scale reference computed from the POIs). Finally, the collocated waypoints are evenly distributed along this segment. They are ordered according to their original waypoint order, such that the first one is at the segment endpoint closest to the first point in the reference path.

For a contain constraint to be properly satisfied, the waypoint at the angle's vertex will need to be offset from the contained POI. However, the initial path constructed so far will collocate the waypoint with the POI unless the spreading moved it. To aid the optimization framework and suggest which side of the POI the path is likely to pass on, the waypoints can be preemptively offset from the contained POIs in direction that is reasonable for the Contain objective. In particular, waypoints can be pushed outward from the POI along the vector that is normal to the anticipated path bend around the POI.

The procedure outlined above to compute the spreading direction is leveraged to compute an offset direction for each set of waypoints containing the same POIs. However, the offset direction will negate the bisecting direction instead of being perpendicular to it. In addition, the offset length at each POI is ¼ the length of the smaller reference path segment; this aims to move the path to the predicted side of the POI without moving it too much and disturbing the overall topology. If multiple POIs are being contained though, then the waypoints may need to be offset more to accommodate all of them. In this case, a bounding box is drawn around the set of POIs and its diagonal is used as a length reference. The final offset amount is half this length or the average of the per-POI offset lengths, whichever is larger.

3.3.5 Step 5: Optimize Waypoint Positions

In the fifth step 1774, the waypoint positions determined above are optimized. Given the set of constraints and initial guesses for waypoint positions, the trajectory generation problem can be cast as a constrained nonlinear optimization problem.

3.3.5.1 Objective Function

A goal is to find a trajectory that satisfies the constraints but having a path that is as efficient as possible is often desirable. With this in mind, the metric that the optimization seeks to minimize is the total path length. One example of an objective function and its gradient is specified analytically using the sum of segment distances between consecutive waypoints:

$$\sum_{n=1}^{N-1} |W_{n+1} W_n|$$

3.3.5.2 Optimizer Setup

In one example, optimization uses Matlab's fmincon function with the interior-point algorithm to optimize a vector representing the x and y coordinates of all waypoints. All constraint classes in the constraint graph are converted to nonlinear inequality constraints with gradients specified or to bounds constraints according to the formulations described in the Constraint Library section. Note that each constraint class embeds a scaling that aims to keep constraint values on the same order of magnitude. To supplement this and help ensure that values are comparable from all constraint classes, the option of fmincon to scale the problem is also enabled; this will scale all constraint values and the objective function by their initial values. Note that in the future, the relative magnitudes of constraint classes could be adjusted to implicitly weight certain behaviors as more or less important than others.

At each iteration, all of the nonlinear constraint functions are evaluated with the current estimated waypoint positions. The constraint values and their gradients with respect to each waypoint coordinate are concatenated to form a single vector of constraints for the optimizer.

The tolerance on the objective function to determine when an optima has been achieved is set to the scale reference for the new scenario divided by 100. This will typically be on the order of centimeters for the current experimental scenarios, which ensures that the path length is sufficiently optimized without causing unnecessary complexity since the emphasis is on constraint satisfaction. In addition to this stopping criterion, a maximum of 550 iterations is enforced.

3.3.5.3 Adjusting Constraints to Improve Feasibility

Depending on the initial path and the particular set of constraints, a feasible solution may not be found. In this case, adjustments are made that increase the optimizer's flexibility to explore different trajectories. Two approaches are currently implemented: temporarily disabling certain constraints, and relaxing constraints.

The first method of adjustment temporarily disables constraints that notably restrict deviations from the initial path. Solutions found with a reduced set of constraints can then be used as initial paths for solving the problem with all constraints. Some approaches include automatically disabling constraints based on which ones are violated. Other approaches include manually specifying a sequence of constraint class subsets:

1) Do not disable any constraints. This represents the initial, fully constrained attempt.
2) Disable Bend constraints. Although this constraint class allows any angle between 10 and 170 degrees, enforcing it at each iteration of the optimization means that path angles are restricted to bending in the same direction as in the initial path guess. Removing this constraint allows the optimizer to change which way the path turns at each waypoint.
3) Disable Bend and Buffer constraints. Enforcing a buffer distance between segments and POIs at each optimization iteration means that a path segment must remain on the same side of a POI as it was in the initial path. Removing this constraint allows the optimizer to smoothly rearrange the path without worrying about 'colliding' with the POIs.

The system will iteratively move down through this sequence and attempt to solve the optimization with the specified subset of constraint classes. Whenever a feasible solution is found for a subset, it moves back up the list using previous solutions as initial paths. So, if solving with all constraints fails, it will try to solve without the Bend constraints; if that succeeds, the solution is used as an initial path for optimizing with all constraints. If the problem was still infeasible after disabling the Bend constraints, then Buffer constraints will also be disabled; if the problem is now feasible, the solution is used as an initial path for optimizing with only the Bend constraints disabled, and then that solution is used as an initial path with all constraints.

The algorithm ends when a solution is found with all constraints active or when all subsets have been tested as the initial set of constraints. The maximum number of optimizations that could be attempted is if using all constraints always fails, but using any subset of constraints always succeeds—in this case, a total of 6 optimization problems is tried.

The second method of adjustment is to relax constraints, and this is used if no solution has been found even after iterating through the constraint subsets. A sequence of how much to relax the constraints is specified ahead of time:

1) No relaxation. This represents the initial, fully constrained attempt.
2) Relax all constraints.
3) Relax all constraints again.
4) Reset all constraints but relax the starting/ending regions.
5) Relax all constraints.
6) Relax all constraints again and relax the starting/ending regions again.

When a stage specifies to relax all constraints, the system invokes the relaxation methods of each constraint class as described in the Constraint Library section. When a stage specifies to relax the starting and ending regions, the tolerances on those regions are multiplied by 1.5.

At each stage of the sequence, optimization is attempted with all constraint subsets described above. If no solution is found after all subsets are exhausted, then the next stage of relaxation is initiated.

Finally, the new task trajectory 114 is formed by generating trajectory and arm orientations. After the main optimization algorithm generates a set of waypoint positions, the trajectory timing and the orientations stored at each waypoint are generalized separately.

The input trajectory is processed to compute the duration of each motion and the duration spent stationary at each waypoint. These are copied to the newly generalized trajectory, according to the waypoint mapping inferred previously. In particular, each new waypoint will consult the input waypoint that it is mimicking; the new waypoint will copy the duration spent stationary at that input waypoint, and the new motion starting at that new waypoint will copy the duration of the motion starting at that input waypoint. If a new waypoint that is not at the end of the new trajectory is mimicking the last input waypoint, then the median motion duration and the median waypoint duration of the input trajectory is used.

For tasks that record an orientation at each waypoint, the input orientations are represented relative to the local input path and then generalized to the newly generated path. In particular, the unit vector representing the orientation at each input waypoint is written as a linear combination of unit vectors pointing along the two path segments intersecting at that waypoint. At each waypoint in the new scenario, an analogous orientation is constructed by applying those weights to the unit vectors pointing along the two new path segments. The mapping between new and input waypoints determined previously are used, so that each new waypoint considers the weights determined for the input waypoint that it is meant to mimic. If the linear decomposition failed due to singularities at an input waypoint, then the fallback is to consider the orientation direction relative to the previous or next segment and directly apply that angular offset to the new scenario.

In the examples above, the demonstration task is followed by the apprenticeship task, which is the followed by the generalization step. However, it should be noted that, in some examples, the system can omit the apprenticeship task and the generalization step can generalize performance of tasks data from the demonstration task without requiring any of the corrections made in the apprenticeship task.

4 System Implementation

In general, the system includes of the wearable sensor, the processing pipelines, and the robots executing the trajectories. Gestures are detected online using the streaming pipelines while the proposed motion estimation pipeline augments this communication vocabulary with continuous motions extracted offline. Robots are controlled to follow the estimated trajectories, and to respond to adjustment commands from a supervisor during apprenticeship.

Since the system is designed to infer and generate motion paths that can be followed by any sufficiently capable robot, the control is abstracted to a core set of functionalities with implementation details specified for each desired robot. Each robot interface just needs to provide methods for moving to a desired waypoint by a desired time, reporting whether it has completed a motion, and stopping immediately even if a motion is ongoing. These methods are then used to autonomously follow trajectories and respond to interventions when needed.

If the robot provides a method to internally estimate its current position, then the system uses this to know when target positions have been reached and to record a more accurate current position at the end of an intervention. If the robot does not have an internal position estimate, then it will operate open-loop and assume that the target is successfully reached when a motion or gesture adjustment concludes.

To perform cable-routing tasks on a vertical board, the robot moves to any desired waypoint by driving forward and backward in front of the board and lifting its arm up and down. The robot may be initially manually oriented such that its driving axis is parallel to the board's x axis. Its base and arm are also manually moved to point at a known position on the board. The robot's internal state is then recorded to home the robot and map the internal position estimates to world frame coordinates. A waypoint is considered successfully reached if the driving and lifting coordinates are each within 0.5 cm of the target positions.

When moving between waypoints, velocity and acceleration profiles are computed such that the gripper will trace a linear path between the current position and the target position. If the driving component or the lifting component of the displacement cannot be achieved in the desired motion duration, then the limiting dimension is used to define the new motion duration. Velocities and accelerations for the driving and lifting dimensions are computed such that both will complete at the same time. Driving speeds are currently constrained to be between 0.01 and 0.2 m/s, and lifting speeds are constrained to be between 0.01 and 0.1 m/s.

To perform outdoor tasks, the robot drives to any desired position by rotating its base and then driving forward. Similar to the cable-routing tasks, the robot is manually moved to a known position and orientation at the start of experiments so that its internal position estimates can be mapped to world frame coordinates. A waypoint is considered successfully reached if the current position estimate computed from wheel odometry is within 8 cm of the target position.

When moving between waypoints, the base will first be rotated to the necessary angle and then a straight drive is commanded. The angle is wrapped to [−180, 180] degrees so the shortest path is taken. Asynchronous timers are used to wait for the turn completion before commanding the drive, so that it does not block the real-time model processing trajectory progress and gesture detections.

While in theory an accurate position estimate can be extracted using wheel odometry, in practice this can be difficult and prone to drift. For example, an estimated turning angle error on the order of 1 degree can lead to significant position errors after driving long distances and making multiple turns. Such offsets in estimated turning angles were empirically measured before the presented experiments, and motion commands were adjusted accordingly to compensate as needed. Some examples use localization pipelines for more accurate traversals of desired trajectories.

When a stationary robot is used, the mapping between robot-centric coordinates and the world frame is static and only needs to be computed once during construction of the task area. For example, when a target waypoint is commanded, inverse kinematics are computed to determine appropriate joint angles. To simplify this computation and to ensure arm configurations that appear natural to a human supervisor, the arm is constrained to move in a vertical plane and then the main shoulder joint is allowed to rotate to achieve horizontal motion. A target arm length is also computed to keep the gripper close to the board as the shoulder joint rotates. In addition to gripper position, the gripper rotation can also be adjusted; this is commanded independently of the arm position according to the desired orientation stored in the trajectory being executed.

The sensor transmits muscle activity, IMU measurements, and computed pose information wirelessly via Bluetooth. EMG signals are sampled at 200 Hz and streamed as 40-sample buffers at 5 Hz. IMU data and pose estimates are sampled at 50 Hz and streamed as 10-sample buffers at 5 Hz.

EMG signals are conditioned using a conditioning pipeline. In particular, an IIR Butterworth bandpass filter is applied between 5-100 Hz. Envelope detection is then performed via full-wave rectification, applying a 2nd order IIR 5 Hz lowpass filter, and applying a 1.5× gain.

The main Simulink model to process this data and control the robot operates at 400 Hz. Within this model, the wrist flexion/extension classifier operates at 80 Hz, while all other gesture detection pipelines operate at 50 Hz.

During experiments, information is also recorded that indicates key events such as when trials start or stop. These are used offline to segment recorded data. In addition, trials can be annotated with information such as whether they should be removed from the data corpus due to technical issues or user confusion.

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for configuring an electromechanical system to perform a first task, the method comprising:
- accepting a specification of the first task;
- accepting first user input from an operator related to the operator performing the first task, the first user input including a representation of user-referenced points;
  - forming first control data for causing the system to perform the first task based on the specification of the first task and the first user input;
  - accepting second user input from the operator as the system performs the first task based on the first control data and forming updated first control data based on the second user input; and
  - causing the electromechanical system to perform the task based on the updated first control data.

2. The method of claim 1 further comprising forming second control data for causing the system to perform a second task, the forming being based at least in part on the specification of the first task, a specification of the second task, the updated first control data, and a plurality of constraints.

3. The method of claim 1 wherein the first control data is updated during the system's performance of the first task using the first control data to generate the updated first control data.

4. The method of claim 1 wherein the second user input represents corrections to the robot's performance of the first task.

5. The method of claim 4 wherein the second user input includes gesture-based input representing corrections to the robot's performance of the first task.

6. The method of claim 2 wherein forming the first control data includes determining first trajectory data for the electromechanical system to follow to complete the first task based on the first user input.

7. The method of claim 6 wherein forming the second control data includes determining second trajectory data for the electromechanical system to follow to complete the second task based at least in part the specification of the first task, the specification of the second task, the updated first control data, and the plurality of constraints.

8. The method of claim 7 wherein determining the second trajectory data includes generalizing an operation of the robot performing the first task such that the robot can complete the second task.

9. The method of claim 7 wherein the plurality of constraints is expert-defined.

10. The method of claim 9 wherein the plurality of constraints includes a corresponding plurality of constraint definitions, at least some constraint definitions of the plurality of constraint definitions specifying a restriction on a behavior of the robot during performance of tasks.

11. The method of claim 10 wherein the constraint definitions specify restrictions on the behavior of the robot when the robot encounters points of interest during performance of tasks.

12. The method of claim 1 wherein the first user input is measured using a sensor attached to the operator during performance of the first task by the operator.

13. The method of claim 12 wherein the sensor includes an inertial measurement unit and an electromyography sensor.

14. The method of claim 13 wherein accepting the first user input includes using the electromyography sensor to sense muscular activity of the operator as the operator performs the first task.

15. The method of claim 13 wherein accepting the first user input includes using the inertial measurement unit to measure changes in a position and orientation of the operator's hand.

16. The method of claim 13 wherein the first user input includes gesture-based input.

17. The method of claim 1 wherein at least some of the first user input includes gesture-based input including hand gestures for indicating the user-referenced points as the operator performs the first task.

18. A system for configuring an electromechanical system to perform a first task, the system comprising:
- a first input for accepting a specification of the first task;
  - second input for accepting first user input from an operator related to the first task, the first user input including a representation of user-referenced points;
  - one or more processors configured to form first control data for causing the system to perform the first task based on the specification of the first task and the first user input;
  - accept second user input from the operator as the system performs the first task based on the first control data and forming updated first control data based on the second user input; and
  - cause the electromechanical system to perform the task based on the updated first control data.

19. Software, executable by a processor and stored in a non-transitory computer-readable medium, the software including instructions for causing a computing system to implement a method for configuring an electromechanical system to perform a first task including:
- accepting a specification of the first task;
- accepting first user input from an operator related to the first task, the first user input including a representation of user-referenced points;
- forming first control data for causing the system to perform the first task based on the specification of the first task and the first user input;
- accepting second user input from the operator as the system performs the first task based on the first control data and forming updated first control data based on the second user input; and
- causing the electromechanical system to perform the task based on the updated first control data.

* * * * *